US012534593B2

(12) United States Patent
Lee et al.

(10) Patent No.: US 12,534,593 B2
(45) Date of Patent: Jan. 27, 2026

(54) ENCAPSULATION COMPOSITION

(71) Applicant: LG CHEM, LTD, Seoul (KR)

(72) Inventors: Seung Min Lee, Daejeon (KR); Yeong Bong Mok, Daejeon (KR); Sung Nam Moon, Daejeon (KR); Se Woo Yang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 1166 days.

(21) Appl. No.: 17/299,222

(22) PCT Filed: Dec. 9, 2019

(86) PCT No.: PCT/KR2019/017290
§ 371 (c)(1),
(2) Date: Jun. 2, 2021

(87) PCT Pub. No.: WO2020/117024
PCT Pub. Date: Jun. 11, 2020

(65) Prior Publication Data
US 2022/0029133 A1  Jan. 27, 2022

(30) Foreign Application Priority Data

Dec. 7, 2018 (KR) .................. 10-2018-0157182

(51) Int. Cl.
| | | |
|---|---|---|
| *C08L 23/22* | (2025.01) | |
| *B01J 20/04* | (2006.01) | |
| *B01J 20/26* | (2006.01) | |
| *B01J 20/28* | (2006.01) | |
| *C08K 3/22* | (2006.01) | |
| *C09D 123/22* | (2006.01) | |
| *H10K 59/80* | (2023.01) | |
| *H10K 71/00* | (2023.01) | |
| *H10K 85/10* | (2023.01) | |

(52) U.S. Cl.
CPC ............... *C08K 3/22* (2013.01); *B01J 20/041* (2013.01); *B01J 20/261* (2013.01); *B01J 20/28004* (2013.01); *B01J 20/28021* (2013.01); *B01J 20/28035* (2013.01); *H10K 59/874* (2023.02); *H10K 71/00* (2023.02); *H10K 85/151* (2023.02)

(58) Field of Classification Search
CPC .... C09D 123/22; C09D 23/22; H10K 59/874; C08K 2003/2206; C08K 2003/22; C08K 9/04; C08K 9/00; C08K 5/01
See application file for complete search history.

(56) References Cited

U.S. PATENT DOCUMENTS

| | | | |
|---|---|---|---|
| 9,676,978 | B2 | 6/2017 | Kageyama |
| 9,758,690 | B2 | 9/2017 | Ishiguro et al. |
| 9,923,169 | B2 | 3/2018 | Yoo et al. |
| 10,074,827 | B2 | 9/2018 | Yoo et al. |
| 10,115,904 | B2 | 10/2018 | Ishiguro et al. |
| 2015/0299523 | A1 | 10/2015 | Park et al. |
| 2017/0186997 | A1* | 6/2017 | Yoo ........................ C09J 151/04 |

FOREIGN PATENT DOCUMENTS

| | | | | |
|---|---|---|---|---|
| CN | 104039910 | A | 9/2014 | |
| EP | 2781571 | B1 | 7/2020 | |
| JP | 2008115383 | A | 5/2008 | |
| JP | 2013020900 | A | 1/2013 | |
| JP | 5258575 | B2 | 5/2013 | |
| JP | 5365891 | B2 | 9/2013 | |
| JP | 2014127266 | A | 7/2014 | |
| JP | 5601202 | B2 | 8/2014 | |
| JP | 2016513155 | A | 5/2016 | |
| JP | 2016524295 | A | 8/2016 | |
| JP | 2018-505070 | A | 2/2018 | |
| KR | 1020040105993 | A | 12/2004 | |
| KR | 1020080088606 | A | 10/2008 | |
| KR | 10-2014-0121843 | A | 10/2014 | |
| KR | 10-2015-0103055 | A | 9/2015 | |
| KR | 10-2016-0096045 | A | 8/2016 | |
| KR | 10-1807380 | B1 | 12/2017 | |
| TW | 201518102 | A | 5/2015 | |
| WO | 2008062866 | A1 | 5/2008 | |
| WO | 2010084939 | A1 | 7/2010 | |
| WO | 2014/123197 | A1 | 8/2014 | |
| WO | WO-2015068805 | A1 * | 5/2015 | .............. C08L 23/22 |
| WO | 2016/021459 | A1 | 2/2016 | |
| WO | WO-2016158770 | A1 * | 10/2016 | ............ C08L 101/12 |
| WO | 2017/030047 | A1 | 2/2017 | |
| WO | 2017073438 | A1 | 5/2017 | |

OTHER PUBLICATIONS

Machine translation into English of WO-2016158770-A1; Takase et al (Year: 2016).*
Machine translation into English of WO-2015068805-A1; Takahashi et al (Year: 2015).*

* cited by examiner

*Primary Examiner* — Karuna P Reddy
(74) *Attorney, Agent, or Firm* — Bryan Cave Leighton Paisner LLP

(57) ABSTRACT

The present disclosure relates to an encapsulation composition, an encapsulation film comprising the same, an organic electronic device comprising the same, and a method for manufacturing an organic electronic device using the same, which provides an encapsulation composition capable of effectively blocking moisture or oxygen introduced into an organic electronic device from the outside and realizing an organic electronic device with an extremely small bezel part structure.

13 Claims, 1 Drawing Sheet

[Figure 1]
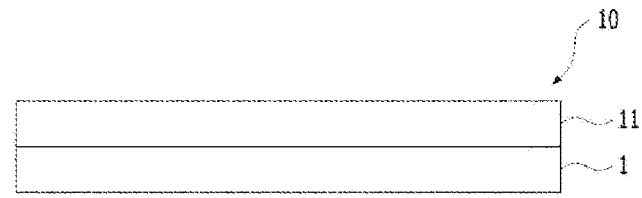
[Figure 2]
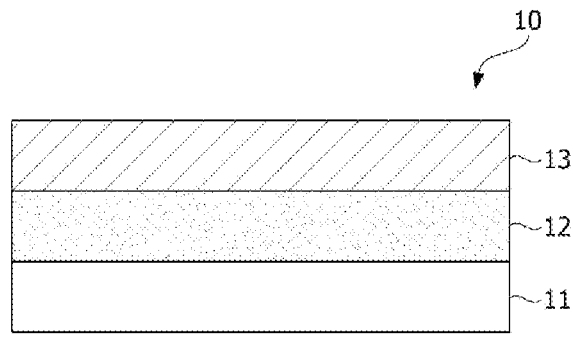
[Figure 3]
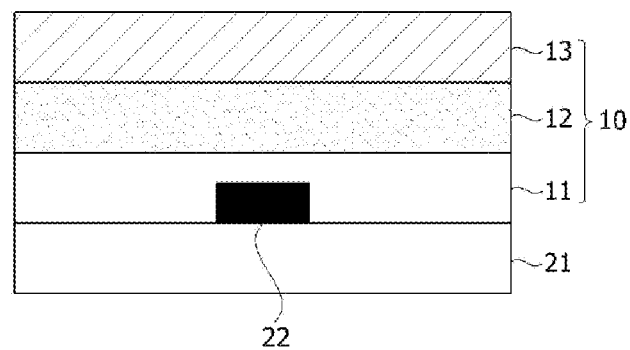

ENCAPSULATION COMPOSITION

CROSS-REFERENCE TO RELATED APPLICATIONS

This application is a National Phase entry pursuant to 35 U.S.C. § 371 of International Application No. PCT/KR2019/017290, filed Dec. 9, 2019, and claims the benefit of and priority to Korean Patent Application No. 10-2018-0157182, filed on Dec. 7, 2018, the disclosures of which are hereby incorporated by reference in their entirety for all purposes as if fully set forth herein.

TECHNICAL FIELD

The present application relates to an encapsulation composition, an encapsulation film comprising the same, an organic electronic device comprising the same, and a method for manufacturing an organic electronic device using the same.

BACKGROUND ART

An organic electronic device (OED) means a device comprising a layer of an organic material that generates an alternating current of electric charges using holes and electrons, and an example thereof may include a photovoltaic device, a rectifier, a transmitter and an organic light emitting diode (OLED), and the like.

The organic light emitting diode (OLED) among the organic electronic devices has lower power consumption and faster response speed, than conventional light sources, and is advantageous for thinning display devices or illuminations. In addition, the OLED has excellent space utilization, so that it is expected to be applied in various fields covering various portable devices, monitors, notebooks, and televisions.

In commercialization and application expansion of OLEDs, the most important problem is a durability problem. Organic materials and metal electrodes, and the like, contained in OLEDs are very easily oxidized by external factors such as moisture. Thus, products comprising OLEDs are highly sensitive to environmental factors. Accordingly, various methods have been proposed to effectively block penetration of oxygen or moisture from the outside into organic electronic devices such as OLEDs.

In addition, while OLEDs have been mass-produced with research and development for years, the development direction of displays is gradually aimed at reducing bezel parts, and in order to reduce the bezel part like this, it is in a situation where the barrier performance against moisture penetrating from the outside must reach the limit.

DISCLOSURE

Technical Problem

The present application provides an encapsulation composition which can effectively block moisture or oxygen introduced into an organic electronic device from the outside and can realize an organic electronic device with an extremely small bezel part structure, an encapsulation film comprising the same, and an organic electronic device comprising the same.

Technical Solution

The present application relates to an encapsulation composition. The encapsulation composition can be applied, for example, to perform encap or encapsulation of an organic electronic device such as an OLED.

In this specification, the term "organic electronic device" means an article or device having a structure comprising an organic material layer that generates an alternating current of electric charges using holes and electrons between a pair of electrodes facing each other, and an example thereof may include a photovoltaic device, a rectifier, a transmitter and an organic light emitting diode (OLED), and the like, but is not limited thereto. In one example of the present application, the organic electronic device may be an OLED.

An exemplary encapsulation composition can be a composition for encapsulating an organic electronic element. The encapsulation composition can comprise an encapsulation resin and a moisture adsorbent surface-treated with an aliphatic hydrocarbon compound. The encapsulation resin can comprise an olefinic resin. By comprising the resin and the specific moisture adsorbent together, the present application can effectively block moisture even in harsh conditions.

In an embodiment of the present application, the encapsulation resin can be a crosslinkable resin or a curable resin. In one example, the resin can be a photocurable resin or a thermosetting resin. In one example, the encapsulation resin can have a glass transition temperature of less than 0° C., less than −10° C. or less than −30° C., less than −50° C. or less than −60° C. The lower limit is not particularly limited, but can be −100° C. or higher. Here, the glass transition temperature can be a glass transition temperature of the composition of the encapsulation resin alone after curing or crosslinking.

The present application can comprise an olefinic resin as the encapsulation resin. The olefinic resin can comprise a homopolymer or a copolymer of an olefinic compound. In one example, the encapsulation resin can be a polymer derived from butylene. In the present application, the term "polymer derived from butylene" can mean that one or more of polymerized units in the polymer are made of butylene. Since the polymer derived from butylene has very low polarity, is transparent and is hardly affected by corrosion, it can realize excellent moisture barrier properties and endurance reliability when used as an encapsulation material or a sealing material.

In the present application, the polymer derived from butylene can also be a homopolymer of a butylene monomer; a copolymer obtained by copolymerizing a butylene monomer with other monomers polymerizable with the butylene monomer; a reactive oligomer using the butylene monomer; or a mixture thereof. In the present application, the derived polymer can mean that the monomer forms the polymer in a polymerized unit. The butylene monomer can include, for example, 1-butene, 2-butene or isobutylene.

Other monomers polymerizable with the butylene monomer or derivatives can include, for example, isoprene, styrene or butadiene. By using the copolymer, physical properties such as processability and a crosslinking degree can be maintained, and thus the encapsulation composition can ensure its own heat resistance when applied to an organic electronic device.

In addition, the reactive oligomer using the butylene monomer can comprise a butylene polymer having a reactive functional group. The oligomer can have a weight average molecular weight ranging from 500 to 5000 g/mol. Furthermore, the butylene polymer can be coupled to another polymer having a reactive functional group. The other polymer can be, but is not limited to, alkyl (meth) acrylate. The reactive functional group can be a hydroxyl group, a carboxyl group, an isocyanate group or a nitrogen-containing group. Also, the reactive oligomer and the other polymer can be cross-linked by a multifunctional cross-linking agent, and the multifunctional cross-linking agent can be at least one selected from the group consisting of an isocyanate cross-linking agent, an epoxy cross-linking agent, an aziridine cross-linking agent and a metal chelate cross-linking agent.

In one example, the polymer derived from butylene of the present application can be a copolymer of a diene compound and an olefinic compound containing one carbon-carbon double bond. Such a copolymer can contain unsaturated groups such as double bonds in the encapsulation resin backbone. Here, the olefinic compound can include butylene or the like, and the diene can be a monomer polymerizable with the olefinic compound, which can include, for example, isoprene or butadiene, and the like. For example, the copolymer of the olefinic compound containing one carbon-carbon double bond, and the diene can be a butyl rubber.

In the present application, the polymer can have a weight average molecular weight (MW) to the extent that a pressure-sensitive adhesive composition can be molded into a film shape. For example, the polymer can have a weight average molecular weight of about 10,000 to 2,000,000 g/mol, 100,000 to 1,500,000 g/mol, 150,000 to 1,300,000 g/mol, 330,000 to 1,000,000 g/mol or 350,000 to 900,000 g/mol or so. In the present application, the term weight average molecular weight means a converted value for standard polystyrene measured by GPC (gel permeation chromatograph). However, a resin component does not necessarily have to have the above-mentioned weight average molecular weight. For example, even when the molecular weight of the resin component does not become a level enough to form a film, a separate binder resin can be blended into the composition. In this specification, the terms polymer and resin component can be used interchangeably.

The encapsulation composition of the present application can comprise a moisture adsorbent. In this specification, the term "moisture adsorbent" can mean, for example, a chemically reactive adsorbent capable of removing moisture or humidity penetrated into the encapsulation film through the chemical reaction therewith.

As described above, the surface of the moisture adsorbent can be surface-treated with an aliphatic hydrocarbon compound, where the aliphatic hydrocarbon compound can contain at least one or more polar functional groups. The polar functional group can include, for example, a hydroxyl group, a carboxyl group, an amine group, an acryl group, a methacryl group, an aldehyde group, an epoxy group, an anhydride group, an amide group, a phosphate group or a combination thereof. By using the moisture adsorbent, the present application can particularly increase the compatibility with the above-mentioned encapsulation resin, thereby realizing excellent moisture barrier performance.

In an embodiment of the present application, the surface of the moisture adsorbent can be surrounded by an aliphatic hydrocarbon compound. The aliphatic hydrocarbon compound can be, for example, a compound containing a polar functional group in its molecular structure, and the structure thereof is not particularly limited as long as it has the polar functional group. In one example, the polar functional group can be located at the end of the aliphatic hydrocarbon compound. In one example, the aliphatic hydrocarbon compound can be a compound having a carbon number in a range of 5 to 50 or 10 to 40, where the compound can have a linear, branched or cyclic structure. The lower limit of the carbon number can be, for example, 8, 10, 13, 15, 16, or 17 or more, and the upper limit can be, for example, 45, 40, 35, 30, 28, 25, 23, 20, 19, or 18 or less. The structure that the aliphatic hydrocarbon compound surrounds the surface of the moisture adsorbent can be a structure that the polar functional groups are present on the surface to be in contact with the moisture adsorbent and the non-polar main chain is connected through the polar functional groups. The structure can increase the compatibility of the moisture adsorbent with the encapsulation resin, can implement excellent moisture barrier performance, and can disperse a large amount of moisture adsorbent as compared to the prior art. The aliphatic hydrocarbon compound can use one of the surfactants, and as long as it has the structure, it is not particularly limited, which can include, for example, stearic acid, palmitic acid, oleic acid, oleylamine, octadecylamine, arachidic acid, linoleic acid, dibutyl phosphate, laureth-4-carboxylic acid, laureth-6-carboxylic acid or laureth-11-carboxylic acid.

In one example, the moisture adsorbent can be pulverized in the form of particles to be present in an evenly dispersed state in the encapsulation composition. Here, the evenly dispersed state can mean a state where the moisture adsorbent is present at the same density or substantially the same density even in any part of the encapsulation composition. Here, the usable moisture adsorbent can include, for example, a metal oxide, a sulfate or an organic metal oxide, and the like. Specifically, an example of the sulfate can include magnesium sulfate, sodium sulfate or nickel sulfate, and the like, and an example of the organic metal oxide can include aluminum oxide octylate and the like. Here, a specific example of the metal oxide can include phosphorus pentoxide ($P_2O_5$), lithium oxide ($Li_2O$), sodium oxide ($Na_2O$), barium oxide (BaO), calcium oxide (CaO) or magnesium oxide (MgO), and the like, and an example of the metal salt can include a sulfate such as lithium sulfate ($Li_2SO_4$), sodium sulfate ($Na_2SO_4$), calcium sulfate ($CaSO_4$), magnesium sulfate ($MgSO_4$), cobalt sulfate ($CoSO_4$), gallium sulfate ($Ga_2(SO_4)_3$), titanium sulfate ($Ti(SO_4)_2$) or nickel sulfate ($NiSO_4$); a metal halide such as calcium chloride ($CaCl_2$), magnesium chloride ($MgCl_2$), strontium chloride ($SrCl_2$), yttrium chloride ($YCl_3$), copper chloride ($CuCl_2$), cesium fluoride (CsF), tantalum fluoride ($TaF_5$), niobium fluoride ($NbF_5$), lithium bromide (LiBr), calcium bromide ($CaBr_2$), cesium bromide ($CeBr_3$), selenium bromide ($SeBr_4$), vanadium bromide ($VBr_3$), magnesium bromide ($MgBr_2$), barium iodide ($BaI_2$) or magnesium iodide ($MgI_2$); or a metal chlorate such as barium perchlorate ($Ba(ClO_4)_2$) or magnesium perchlorate ($Mg(ClO_4)_2$), and the like, without being limited thereto. As the moisture adsorbent which can be included in the encapsulation composition, one of the above-described structures can also be used, or two or more can also be used. In one example, when two or more are used as the moisture adsorbent, calcined dolomite or the like can be used.

Such a moisture adsorbent can be controlled to an appropriate size depending on the application. In one example, the average particle diameter of the moisture adsorbent can be controlled to 8 μm or less, 7 μm or less, or 6 μm or less or so. The lower limit is not particularly limited, but can be 0.1 μm, 0.5 μm or 1 μm. The particle diameter can be measured by a particle size analysis according to D90. The moisture adsorbent having a size in the above range is easy to store because the reaction rate with the moisture is not too fast, and can effectively remove moisture without damaging an element to be encapsulated. In addition, as described above, the moisture adsorbent having a smaller particle size than the conventional one can be dispersed in the encapsulation composition in a larger amount than the conventional one.

The content of the moisture adsorbent is not particularly limited, which can be appropriately selected in consideration of the desired barrier property. In one example, the moisture adsorbent can be included in an amount of 150 to 15000 parts by weight, 180 to 1400 parts by weight, 220 to 1300 parts by weight, 250 to 1200 parts by weight, 280 to 1100 parts by weight or 300 to 1000 parts by weight relative to 100 parts by weight of the encapsulation resin. The present application can include a large amount of moisture adsorbent as compared to the prior art, thereby realizing excellent moisture barrier performance Conventionally, when a large amount of moisture adsorbent is included as described above, agglomeration or deposition has occurred or an interlayer crack has occurred upon forming a film, but the present application can solve this problem by using the specific moisture adsorbent.

In one example, the encapsulation composition can further comprise a tackifier, where the tackifier can have a softening point of 145° C. or less, or 130° C. or less. The softening point of the tackifier can be, for example, in a range of 20° C. to 130° C. or 50° C. to 125° C. In one example, the tackifier can have a weight average molecular weight in a range of about 300 to 5,000 g/mol or 500 to 3500 g/mol. In addition, the tackifier can be a polymer polymerized from a monomer having a carbon number in a range of 3 to 15 or 5 to 10 in the molecular structure. In addition, the tackifier can have a ring structure in the molecular structure, where the ring structure can be a single ring structure, but is not limited thereto, and it can have a bicyclic or tricyclic structure. By using the specific tackifier, the present application can have excellent compatibility with the encapsulation resin as described above, thereby implementing physical properties intended in the present application. On the other hand, in this specification, the softening point can be measured according to ASTM E28 standard, unless otherwise specified.

In one example, the tackifier can comprise, for example, a piperylene compound, a styrene compound, an alpha methyl styrene compound, an isoprene compound, a cyclopentadiene compound or a dicyclopentadiene compound. The content of the tackifier can be appropriately adjusted as necessary. The tackifier can be included in a range of 140 to 450 parts by weight, 149 to 410 parts by weight or 150 to 405 parts by weight relative to 100 parts by weight of the encapsulation resin. The tackifier of the present application has excellent compatibility together with the specific encapsulation resin and the moisture adsorbent as described above, and accordingly, the content range of the tackifier can be adjusted higher than the conventional one, whereby the bonding performance of the film is implemented efficiently together with moisture barrier properties.

In an embodiment of the present application, the encapsulation composition of the present application can comprise an active energy ray polymerizable compound, which can be polymerized by irradiation of active energy rays, together with the above-described encapsulation resin. The active energy ray polymerizable compound can mean a compound containing one or more, or two or more of, for example, functional groups capable of participating in a polymerization reaction by irradiation of active energy rays, for example, a functional group including an ethylenically unsaturated double bond such as an acryloyl group or a methacryloyl group and a functional group such as an epoxy group or an oxetane group. In the present application, the encapsulation resin can have an unsaturated group prior to curing or crosslinking, where the unsaturated group makes it possible to participate in crosslinking together when crosslinking the multifunctional active energy ray polymerizable compound. In one example, the encapsulation composition of the present application can be cured or crosslinked by comprising an active energy ray polymerizable compound having high compatibility with the encapsulation resin and being capable of forming a specific cross-linked structure together with the encapsulation resin.

The active energy ray polymerizable compound can be a multifunctional active energy ray polymerizable compound, which can be, for example, a multifunctional acrylate (MFA).

The multifunctional active energy ray polymerizable compound which can be polymerized by irradiation of active energy rays can satisfy the following formula 1. In addition, the active energy ray-polymerizable compound can be included in an amount of 2 parts by weight to 35 parts by weight, 3 to 30 parts by weight, 5 parts by weight to 25 parts by weight, 8 parts by weight to 20 parts by weight, 10 parts by weight to 18 parts by weight or 12 parts by weight to 18 parts by weight relative to 100 parts by weight of the encapsulation resin.

[Formula 1]

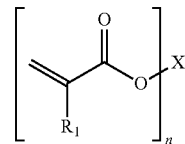

In Formula 1, $R_1$ is hydrogen or an alkyl group having 1 to 4 carbon atoms, n is a number of 2 to 10 or 2 to 6, and X represents a residue derived from a linear, branched or cyclic alkyl group having 3 to 30 carbon atoms. Here, when X is a residue derived from a cyclic alkyl group, X can be, for example, a residue derived from a cyclic alkyl group having 3 to 30 carbon atoms, 6 to 28 carbon atoms, 8 to 22 carbon atoms, or 12 to 20 carbon atoms. Also, when X is a residue derived from a linear alkyl group, X can be a residue derived from a linear alkyl group having 3 to 30 carbon atoms, 6 to 25 carbon atoms, or 8 to 20 carbon atoms. In addition, when X is a residue derived from a branched alkyl group, X can be a residue derived from a branched alkyl group having 3 to 30 carbon atoms, 5 to 25 carbon atoms, or 6 to 20 carbon atoms.

In this specification, the term "residue derived from an alkyl group" can mean, as a residue of a specific compound, one composed of an alkyl group. In one example, in Formula 1 above, when n is 2, X can be an alkylene group. In addition, when n is 3 or more, X can be bonded to the (meth)acryloyl group of Formula 1 by desorbing two or more of hydrogen in the alkyl group.

In this specification, the term "alkyl group" can mean an alkyl group having 1 to 30 carbon atoms, 1 to 25 carbon atoms, 1 to 20 carbon atoms, 1 to 16 carbon atoms, 1 to 12 carbon atoms, 1 to 8 carbon atoms or 1 to 4 carbon atoms, unless otherwise specified. The alkyl group can have a linear, branched or cyclic structure, which can be optionally substituted by one or more substituents.

In this specification, the term "alkylene group" can mean an alkylene group having 2 to 30 carbon atoms, 2 to 25 carbon atoms, 2 to 20 carbon atoms, 2 to 16 carbon atoms, 2 to 12 carbon atoms, 2 to 10 carbon atoms or 2 to 8 carbon atoms, unless otherwise specified. The alkylene group can have a linear, branched or cyclic structure, which can be optionally substituted by one or more substituents.

The active energy ray polymerizable compound which can be polymerized by the irradiation of active energy rays can be used without limitation as long as it satisfies Formula 1 above. For example, the compound can include 1,4-butanediol di(meth)acrylate, 1,3-butylene glycol di(meth)acrylate, 1,6-hexanediol di(meth)acrylate, 1,8-octanediol di(meth)acrylate, 1,12-dodecanediol di(meth)acrylate, neopentylglycol di(meth)acrylate, dicyclopentanyl di(meth)acrylate, cyclohexane-1,4-dimethanol di(meth)acrylate, tricyclodecane dimethanol (meth)diacrylate, dimethylol dicyclopentane di(meth)acrylate, neopentylglycol modified trimethylpropane di(meth)acrylate, adamantane di(meth)acrylate, trimethylolpropane tri(meth)acrylate or a mixture thereof.

As the active energy ray polymerizable compound, a compound containing 2 or more functional groups, in which the weight average molecular weight can be less than 1,000 g/mol, 800 g/mol or less, or 450 g/mol or less, and the lower limit is, for example, 100 g/mol or more, can be used. The ring structure included in the active energy ray polymerizable compound can be a carbocyclic structure or a heterocyclic structure; or a monocyclic or polycyclic structure.

In an embodiment of the present invention, the encapsulation composition can further comprise a radical initiator so as to be capable of inducing the polymerization reaction of the active energy ray polymerizable compound as described above. The radical initiator can be a photo-initiator or a thermal initiator. The specific types of photo-initiators can be appropriately selected in consideration of the curing rate and the possibility of yellowing, and the like. For example, a benzoin-based, hydroxy ketone-based, amino ketone-based or phosphine oxide-based photo-initiator, and the like can be used, and specifically, benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1 one, 1-hydroxycyclohexyl phenyl ketone, 2-methyl-1-[4-(methylthio)phenyl]-2-morpholino-propane-1-one, 4-(2-hydroxyethoxy)phenyl-2-(hydroxy-2-propyl) ketone, benzophenone, p-phenylbenzophenone, 4,4'-diethylaminobenzophenone, dichlorobenzophenone, 2-methylanthraquinone, 2-ethyl anthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-ethylthioxanthone, benzyl dimethyl ketal, acetophenone dimethyl ketal, p-dimethylamino benzoic acid ester, oligo[2-hydroxy-2-methyl-1-[4-(1-methylvinyl)phenyl]propanone] and 2,4,6-trimethylbenzoyl-diphenyl-phosphineoxide, and the like can be used.

The radical initiator can also be included in a ratio of 0.2 parts by weight to 20 parts by weight relative to 100 parts by weight of the active energy ray polymerizable compound. Through this, the reaction of the active energy ray polymerizable compound can be effectively induced, and also the deterioration of physical properties of the cured or cross-linked encapsulation composition due to the remaining components after curing can be prevented.

In one example, the encapsulation composition can also comprise an inorganic filler, if desired. In this specification, the term "inorganic filler" can mean a material that has no reactivity with moisture or lower reactivity than that of the above-described moisture adsorbent, but can block or hinder movement of moisture or humidity in the film. As the inorganic filler, for example, one or two or more of clay, talc, silica, acicular silica, platy silica, porous silica, zeolite, titania or zirconia can be used. In addition, the inorganic filler can be surface-treated with an organic modifier or the like to facilitate penetration of organic matters. As such an organic modifier, for example, an organic modifier or the like, which is dimethyl benzyl hydrogenated tallow quaternary ammonium, dimethyl dihydrogenated tallow quaternary ammonium, methyl tallow bis-2-hydroxyethyl quaternary ammonium, dimethyl hydrogenated tallow 2-ethylhexyl quaternary ammonium, dimethyl dehydrogenated tallow quaternary ammonium or a mixture thereof, can be used.

The content of the inorganic filler is not particularly limited, which can be appropriately selected in consideration of the desired barrier property. In one example, the inorganic filler can be included in an amount of 5 to 100 parts by weight relative to 100 parts by weight of the encapsulation resin.

In addition, the encapsulation composition can comprise, in addition to the above-described constitutions, various additives according to uses and a manufacturing process to be described below.

In an embodiment of the present application, the encapsulation composition can be solid or semisolid at room temperature in a cured or uncured state. In this specification, the term room temperature can be a temperature of about 15° C. to 35° C., 20° C. to 30° C. or about 25° C.

The present application also relates to an encapsulation film. The encapsulation film can comprise an encapsulation layer including the above-described encapsulation composition. The encapsulation layer can be a single layer or a multilayer structure of two or more layers. The encapsulation resin can be included in an amount of 5 wt % or more, 10 to 85 wt %, 12 to 83 wt %, 15 to 80 wt %, 17 to 78 wt % or 20 to 73 wt % in the total resin component weight in the encapsulation layer. In this specification, the resin component can comprise the encapsulation resin or the above-described tackifier (tackifying resin). In addition, a component such as the active energy ray polymerizable compound, the tackifier, the radical initiator, the moisture adsorbent or the inorganic filler as described above can be included in the encapsulation layer, without being limited thereto. In addition, the encapsulation layer can be a pressure-sensitive adhesive or an adhesive, which comprises the component, and the above-described encapsulation composition can be a pressure-sensitive adhesive composition or an adhesive composition.

The encapsulation layer can be a single layer or a multilayer structure of two or more layers. When the encapsulation layer is a multilayer structure, the encapsulation resin can be included in at least one of the two or more encapsulation layers.

On the other hand, considering that the encapsulation film is applied to encapsulation of an organic electronic element, the content of the moisture adsorbent can be controlled so as to prevent physical and chemical damage of the element. For example, when the encapsulation film encapsulates an organic electronic element, a small amount of a moisture adsorbent can be formed in the encapsulation layer facing the element, or no moisture adsorbent can be included. In one example, when the encapsulation layer facing the element is defined as a second layer, the second layer can comprise 0 to 20% of the moisture adsorbent relative to the total mass of the moisture adsorbent contained in the encapsulation film. In addition, when the encapsulation film encapsulates an organic electronic element and the encapsulation layer formed on one side of the second layer (the side opposite to the organic electronic element direction) is defined as a first layer, the first layer can comprise 80 to 100% of the moisture adsorbent relative to the total mass of the moisture adsorbent contained in the encapsulation film. In addition, in such a structure, the present application can have a ratio of the first layer thickness to the second layer thickness in a range of 1.2 to 8 or 1.5 to 5. In the structure, the present application can realize stability of the organic electronic element while maximizing moisture barrier performance.

The lamination order of the second layer and the first layer to be further laminated is not particularly limited. In addition, the encapsulation film can be composed of three or more layers, and for example, the first layer can be included in two or more layers, or the second layer can be included in two or more layers.

In an embodiment of the present application, the encapsulation film can further comprise a metal layer. The metal layer can be a single layer or a multilayer structure of two or more. At least one of the metal layers can have, for example, a thermal conductivity of 50 to 800 W/mK. In addition, at least one of the metal layers can have a linear expansion coefficient of 20 ppm/° C. or less.

In an embodiment of the present application, the thermal conductivity of the metal layer can be 50 W/mK or more, 80 W/mK or more, 90 W/mK or more, 100 W/mK or more, 110 W/mK or more, 120 W/mK or more, 130 W/mK or more, 140 W/mK or more, 150 W/mK or more, 200 W/mK or more, or 210 W/mK or more. The upper limit of the thermal conductivity is not particularly limited, which can be 800 W/mK or less, or 700 W/mK or less. As at least one metal layer has a high thermal conductivity as above, heat generated at the bonding interface during the metal layer bonding process can be released more quickly. The thermal conductivity can be measured at any one temperature in the temperature range of 0 to 30° C.

In this specification, the term "thermal conductivity" is a degree representing capability in which a material is capable of transferring heat by conduction, where the unit can be expressed by W/mK. The unit represents the degree to which the material transfers heat at the same temperature and distance, which means a unit of heat (watt) to a unit of distance (meter) and a unit of temperature (kelvin). In this specification, the thermal conductivity can mean the thermal conductivity measured according to ASTM E1461. The thermal conductivity can be calculated using thermal diffusivity measured according to ASTM E1461 and known specific heat values.

In one embodiment, at least one of the metal layers can have a linear expansion coefficient in a range of 20 ppm/° C. or less, 18 ppm/° C. or less, 15 ppm/° C. or less, 13 ppm/° C. or less, 9 ppm/° C. or less, 5 ppm/° C. or less, or 3 ppm/° C. or less. The lower limit of the linear expansion coefficient is not particularly limited, but can be 0 ppm/° C. or more, or 0.1 ppm/° C. or more. By adjusting the coefficient of linear expansion of the metal layer, the present application can implement dimensional stability and endurance reliability of the film in the panel driven at high temperature. The linear expansion coefficient can be measured by the standard according to ASTM E831.

In an embodiment of the present application, the metal layer of the encapsulation film can have a thickness in a range of 3 μm to 500 μm, 10 μm to 450 μm, 20 μm to 400 μm, 30 μm to 350 μm or 40 μm to 200 μm. By controlling the thickness of the metal layer, the present application can provide an encapsulation film of a thin film while implementing a sufficient heat dissipation effect. The metal layer can be a thin metal foil or a polymer base layer deposited with a metal. The metal layer is not particularly limited as long as it satisfies the above-described thermal conductivity or linear expansion coefficient and is of a material comprising a metal. The metal layer can comprise any one of a metal, a metal oxide, a metal nitride, a metal carbide, a metal oxynitride, a metal oxyboride and a combination thereof. For example, the metal layer can comprise an alloy in which one or more metal elements or non-metal elements are added to one metal, and can comprise, for example, Invar or stainless steel (SUS). Furthermore, in one example, the metal layer can comprise iron, chromium, copper, aluminum nickel, iron oxide, chromium oxide, silicon oxide, aluminum oxide, titanium oxide, indium oxide, tin oxide, indium tin oxide, tantalum oxide, zirconium oxide, niobium oxide, and a combination thereof. The metal layer can be deposited by electrolysis; or rolling, heat evaporation, electron beam evaporation, sputtering, reactive sputtering, chemical vapor deposition, plasma chemical vapor deposition or electron cyclotron resonance source plasma chemical vapor deposition means. In one example of the present application, the metal layer can be deposited by reactive sputtering.

In one example, the encapsulation film of the present application can further comprise a protective layer formed on the metal layer. The protective layer can comprise a resin component. The material constituting the protective layer is not specifically limited. In one example, the protective layer can be a moisture-proof layer capable of blocking moisture permeation. In one example, the resin component constituting the protective layer can comprise one or more selected from the group consisting of polyorganosiloxane, polyimide, a styrene-based resin or elastomer, a polyolefin-based resin or elastomer, a polyoxyalkylene-based resin or elastomer, a polyester-based resin or elastomer, a polyvinyl chloride-based resin or elastomer, a polycarbonate-based resin or elastomer, a polyphenylene sulfide-based resin or elastomer, a polyamide-based resin or elastomer, an acrylate-based resin or elastomer, an epoxy-based resin or elastomer, a silicone-based resin or elastomer, and a fluorine-based resin or elastomer, but is not limited thereto.

In an embodiment of the present application, a pressure-sensitive adhesive or adhesive can be further included between the protective layer and the metal layer. The material of the pressure-sensitive adhesive or adhesive is not particularly limited and a known material can be used. In one example, the pressure-sensitive adhesive or adhesive can be an acrylic, epoxy-based, urethane-based, silicone-based, or rubber-based pressure-sensitive adhesive or adhesive. Furthermore, in one embodiment, the material of the pressure-sensitive adhesive or adhesive can be the same as or different from the material of the encapsulation layer as described above.

In one example, the encapsulation film can further comprise a base film or a release film (hereinafter, optionally referred to as a "first film"), and can have a structure that the encapsulation layer is formed on the base material or the release film. The structure can further comprise a base or release film (hereinafter, optionally referred to as a "second film") formed on the encapsulation layer or the metal layer. FIG. 1 is a cross-sectional diagram showing an exemplary encapsulation film (10) including an encapsulation layer (11) formed on a base film or a release film (1). In addition, FIG. 2 is a cross-sectional diagram showing an exemplary encapsulation film (10) including the above-described metal layer (12) formed on the encapsulation layer (11) and the above-described protective layer (13) formed on the metal layer.

In the present application, the specific kind of the usable first film is not specifically limited. In the present application, for example, a general polymer film of this field can be used as the first film. In the present application, for example, a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film or a polyimide film, and the like can be used as the base or release film. In addition, an appropriate release treatment can also be performed on one side or both sides of the base film or the release film of the present application. As an example of the release agent used in the release treatment of the base film, alkyd series, silicone series, fluorine series, unsaturated ester series, polyolefin series or wax series, and the like can be used, and among these, it is preferable to use an alkyd-based, silicone-based or fluorine-based release agent in terms of heat resistance, without being limited thereto.

In the present application, the thickness of such a base film or release film (first film) is not particularly limited, which can be appropriately selected depending on the application to be applied. For example, in the present application, the thickness of the first film can be 10 μm to 500 μm, preferably 20 μm to 200 μm or so. If the thickness is less than 10 μm, deformation of the base film may occur easily during the manufacturing process, whereas if it is more than 500 μm, it is economically inefficient.

The thickness of the encapsulation layer included in the encapsulation film of the present application is not particularly limited, which can be appropriately selected according to the following conditions in consideration of the use to which the film is applied. The thickness of the encapsulation layer can be 5 μm to 200 μm, 10 μm to 100 μm, or 15 μm to 60 μm or so. When the encapsulation layer is a multilayer, the thickness can mean a thickness of the multilayer. If the thickness of the encapsulation layer is less than 5 μm, sufficient moisture blocking ability cannot be exerted, whereas if it is more than 200 μm, it is difficult to ensure processability, the thickness expansion is large due to moisture reactivity, so that a deposition film of an organic light emitting element may be damaged, and it is economically inefficient.

The present application also relates to an organic electronic device. As shown in FIG. 3, the organic electronic device can comprise a substrate (21); an organic electronic element (22) formed on the substrate (21); and the above-described encapsulation film (10) encapsulating the entire surface of the organic electronic element (22). The encapsulation film can encapsulate the entire surface of the organic electronic element formed on the substrate, for example, both the upper part and the lateral sides. The encapsulation film (10) can comprise an encapsulation layer (11) comprising the encapsulation composition in a crosslinked or cured state. In addition, the organic electronic device can be formed such that the encapsulation layer contacts the top of the organic electronic element.

Here, the organic electronic element can be, for example, an organic light emitting element.

The encapsulation layer can be formed as a structural adhesive for efficiently fixing and supporting the substrate and the metal layer while exhibiting excellent moisture barrier properties in the organic electronic device. FIG. 3 is a cross-sectional diagram of an exemplary organic electronic device that the encapsulation film (10) including the encapsulation layer (11), the metal layer (12) and the protective layer (13) integrally encapsulates the entire surface of the organic electronic element (22).

In addition, the encapsulation layer can be formed as a stable encapsulation layer regardless of the shape of the organic electronic device such as top emission or bottom emission.

Furthermore, the organic electronic element of the present application can comprise a protective layer (passivation film). The protective layer can prevent damage to the electrodes of the element, which can be formed of a conventional material in the technical field, and for example, can comprise $SiN_x$ or $Al_2O_3$, and the like as an inorganic material. The protective layer can be a passivation layer in which organic layers and inorganic layers are alternately deposited.

The present application also provides a method for manufacturing an organic electronic device. The manufacturing method can comprise a step of applying the above-described encapsulation film to a substrate, on which an organic electronic element is formed, so as to cover the organic electronic element. In addition, the manufacturing method can further comprise a step of curing or crosslinking the encapsulation film. The curing or crosslinking step of the encapsulation film can mean curing or crosslinking of the encapsulation layer, and the curing can proceed before or after the encapsulation film covers the organic electronic element.

In this specification, the term "curing" can mean that the encapsulation layer of the present invention forms a crosslinked structure through heating or UV irradiation processes, and the like to be produced in the form of a pressure-sensitive adhesive. Alternatively, it can mean that the adhesive composition is solidified and attached as an adhesive.

In one example, in the manufacturing method, the organic electronic element can be formed by forming a transparent electrode on a glass or polymer film used as a substrate by a method such as vacuum evaporation or sputtering, forming a luminescent organic material layer composed of, for example, a hole transporting layer, a light emitting layer and an electron transporting layer, and the like on the transparent electrode, and then further forming an electrode layer thereon. Subsequently, the encapsulation layer of the encapsulation film can be placed to cover the entire surface surface of the organic electronic element of the substrate subjected to the above process.

Advantageous Effects

The present application provides an encapsulation composition which can effectively block moisture or oxygen introduced into an organic electronic device from the outside and can realize an organic electronic device with an extremely small bezel part structure, an encapsulation film comprising the same, and an organic electronic device comprising the same.

BRIEF DESCRIPTION OF DRAWINGS

FIGS. 1 and 2 are cross-sectional diagrams showing an encapsulation film according to one example of the present application.

FIG. 3 is a cross-sectional diagram showing an organic electronic device according to one example of the present application.

EXPLANATION OF REFERENCE NUMERALS

10: encapsulation film
1: release film or base film

11: encapsulation layer
12: metal layer
13: protective layer
21: substrate
22: organic electronic element

BEST MODE

Hereinafter, the present invention will be described in more detail through examples according to the present invention and comparative examples not according to the present invention, but the scope of the present invention is not limited by the following examples.

Example 1

(1) Preparation of Encapsulation Layer First Layer Solution

As a moisture adsorbent, CaO (Aldrich) surface-treated with stearic acid on the surface was mixed with toluene as a solvent to prepare a moisture adsorbent solution at a concentration of 50 wt % of the solid content.

Apart from the above, 100 parts by weight of a polyisobutylene resin (B50 from BASF, weight average molecular weight 340,000 g/mol) as an encapsulation resin and 340 parts by weight of H2100 (softening point 102° C.) from HIKOREZ as a tackifier were introduced into a reactor at room temperature. Then, 5 parts by weight of 1,6-hexanediol diacrylate as an active energy ray polymerizable compound and 1 part by weight of a photo-radical initiator (Irgacure 819) were introduced thereto, and the mixture was diluted with toluene so that the solid content was 40 wt % or so. The moisture adsorbent solution prepared in advance was mixed so that the moisture adsorbent was in an amount of 570 parts by weight relative to 100 parts by weight of the encapsulation resin, and homogenized.

(2) Preparation of Encapsulation Layer Second Layer Solution

At room temperature, 100 parts by weight of a polyisobutylene resin (B50 from BASF, weight average molecular weight 340,000 g/mol) as an encapsulation resin and 150 parts by weight of H2100 (softening point 102° C.) from HIKOREZ as a tackifier were introduced into a reactor. Then, 5 parts by weight of 1,6-hexanediol diacrylate as an active energy ray polymerizable compound and 1 part by weight of a photo-radical initiator (Irgacure 819) were introduced thereto, and the mixture was diluted with toluene so that the solid content was 40 wt % or so.

(3) Production of Encapsulation Film

The solution of the first layer prepared above was applied to a release surface of a release PET and dried at 110° C. for 10 minutes to form a layer with a thickness of 40 μm.

The solution of the second layer prepared above was applied to a release surface of a release PET and dried at 130° C. for 3 minutes to form a layer with a thickness of 10 μm.

The two layers were laminated to produce an encapsulation film having a two-layered encapsulation layer.

(4) Production of Encapsulation Film in which Metal Layer is Integrated

The release-treated PET was peeled off on the first layer surface of the two-layered encapsulation layer produced above, and the encapsulation layer was laminated so that the metal layer (aluminum) prepared in advance contacted the first layer.

The laminated metal integral encapsulation film was knife-cut to produce an encapsulation film in a desired shape.

Example 2

An encapsulation film was produced in the same method as in Example 1, except that the first layer solution was prepared as follows.

(1) Preparation of Encapsulation Layer First Layer Solution

As a moisture adsorbent, CaO (Aldrich) surface-treated with stearic acid on the surface was mixed with toluene as a solvent to prepare a moisture adsorbent solution at a concentration of 50 wt % of the solid content.

Apart from the above, 100 parts by weight of a butyl rubber (BR065 from EXXON) as an encapsulation resin and 150 parts by weight of SU120 (softening point 120° C.) from SUKOREZ as a tackifier were introduced into a reactor at room temperature. Then, 5 parts by weight of 1,6-hexanediol diacrylate as an active energy ray polymerizable compound and 1 part by weight of a photo-radical initiator (Irgacure 819) were introduced thereto, and the mixture was diluted with toluene so that the solid content was 45 wt % or so. The moisture adsorbent solution prepared in advance was mixed so that the moisture adsorbent was in an amount of 300 parts by weight relative to 100 parts by weight of the encapsulation resin, and homogenized.

Example 3

An encapsulation film was produced in the same method as in Example 1, except that the first layer solution was prepared as follows.

(1) Preparation of Encapsulation Layer First Layer Solution

As a moisture adsorbent, CaO (Aldrich) surface-treated with stearic acid on the surface was mixed with toluene as a solvent to prepare a moisture adsorbent solution at a concentration of 50 wt % of the solid content.

Apart from the above, 100 parts by weight of a polyisobutylene resin (B50 from BASF, weight average molecular weight 340,000 g/mol) as an encapsulation resin and 400 parts by weight of H2100 (softening point 102° C.) from HIKOREZ as a tackifier were introduced into a reactor at room temperature. Then, 5 parts by weight of 1,6-hexanediol diacrylate as an active energy ray polymerizable compound and 1 part by weight of a photo-radical initiator (Irgacure 819) were introduced thereto, and the mixture was diluted with toluene so that the solid content was 48 wt % or so. The moisture adsorbent solution prepared in advance was mixed so that the moisture adsorbent was in an amount of 1000 parts by weight relative to 100 parts by weight of the encapsulation resin, and homogenized.

Example 4

An encapsulation film was produced in the same method as in Example 1, except that the first layer solution was prepared as follows.

(1) Preparation of Encapsulation Layer First Layer Solution

As a moisture adsorbent, CaO (Aldrich) surface-treated with stearic acid on the surface was mixed with toluene as a solvent to prepare a moisture adsorbent solution at a concentration of 50 wt % of the solid content.

Apart from the above, 100 parts by weight of a butyl rubber (BR065 from EXXON) as an encapsulation resin and 148 parts by weight of SU120 (softening point 120° C.) from SUKOREZ as a tackifier were introduced into a reactor at room temperature. Then, 5 parts by weight of 1,6-hexanediol diacrylate as an active energy ray polymerizable compound and 1 part by weight of a photo-radical initiator (Irgacure 819) were introduced thereto, and the mixture was diluted with toluene so that the solid content was 45 wt % or so. The moisture adsorbent solution prepared in advance was mixed so that the moisture adsorbent was in an amount of 300 parts by weight relative to 100 parts by weight of the encapsulation resin, and homogenized.

Example 5

An encapsulation film was produced in the same method as in Example 1, except that the first layer solution was prepared as follows.
(1) Preparation of Encapsulation Layer First Layer Solution
As a moisture adsorbent, CaO (Aldrich) surface-treated with stearic acid on the surface was mixed with toluene as a solvent to prepare a moisture adsorbent solution at a concentration of 50 wt % of the solid content.
Apart from the above, 100 parts by weight of a polyisobutylene resin (B50 from BASF, weight average molecular weight 340,000 g/mol) as an encapsulation resin and 420 parts by weight of H2100 (softening point 102° C.) from HIKOREZ as a tackifier were introduced into a reactor at room temperature. Then, 5 parts by weight of 1,6-hexanediol diacrylate as an active energy ray polymerizable compound and 1 part by weight of a photo-radical initiator (Irgacure 819) were introduced thereto, and the mixture was diluted with toluene so that the solid content was 48 wt % or so. The moisture adsorbent solution prepared in advance was mixed so that the moisture adsorbent was in an amount of 1000 parts by weight relative to 100 parts by weight of the encapsulation resin, and homogenized.

Example 6

An encapsulation film was produced in the same method as in Example 1, except that the first layer solution was prepared as follows.
(1) Preparation of Encapsulation Layer First Layer Solution
As a moisture adsorbent, CaO (Aldrich) surface-treated with stearic acid on the surface was mixed with toluene as a solvent to prepare a moisture adsorbent solution at a concentration of 50 wt % of the solid content.
Apart from the above, 100 parts by weight of a polyisobutylene resin (B50 from BASF, weight average molecular weight 340,000 g/mol) as an encapsulation resin and 340 parts by weight of H2140 (softening point 140° C.) from HIKOREZ as a tackifier were introduced into a reactor at room temperature. Then, 5 parts by weight of 1,6-hexanediol diacrylate as an active energy ray polymerizable compound and 1 part by weight of a photo-radical initiator (Irgacure 819) were introduced thereto, and the mixture was diluted with toluene so that the solid content was 40 wt % or so. The moisture adsorbent solution prepared in advance was mixed so that the moisture adsorbent was in an amount of 570 parts by weight relative to 100 parts by weight of the encapsulation resin, and homogenized.

Comparative Example 1

An encapsulation film was produced in the same method as in Example 1, except that the first layer solution was prepared as follows.
(1) Preparation of Encapsulation Layer First Layer Solution
As a moisture adsorbent, CaO (Aldrich) was mixed with toluene as a solvent to prepare a moisture adsorbent solution at a concentration of 50 wt % of the solid content.
Apart from the above, 100 parts by weight of a polyisobutylene resin (B50 from BASF, weight average molecular weight 340,000 g/mol) as an encapsulation resin and 380 parts by weight of H2100 (softening point 102° C.) from HIKOREZ as a tackifier were introduced into a reactor at room temperature. Then, 5 parts by weight of 1,6-hexanediol diacrylate as an active energy ray polymerizable compound and 1 part by weight of a photo-radical initiator (Irgacure 819) were introduced thereto, and the mixture was diluted with toluene so that the solid content was 40 wt % or so. The moisture adsorbent solution prepared in advance was mixed so that the moisture adsorbent was in an amount of 570 parts by weight relative to 100 parts by weight of the encapsulation resin, and homogenized.

Comparative Example 2

An encapsulation film was produced in the same method as in Example 1, except that the surface was treated with an epoxy-based silane coupling agent ((3-glycidyloxypropyl)trimethoxysilane) instead of stearic acid as the moisture adsorbent.

Experimental Example 1—Coating Appearance

The coating appearance of the encapsulation films produced in Examples and Comparative Examples was visually observed, which was classified as X when agglomeration of moisture adsorbent particles occurred, and classified as 0 when the appearance was excellent without agglomeration.

Experimental Example 2—Bonding Property

The encapsulation films produced in Examples and Comparative Examples were each laminated on a glass substrate on which an organic electronic element was formed, so that the encapsulation layer covered the element, and pressurized, heated and pressed under conditions of 40° C. and 5 atm using an autoclave to prepare a specimen. Then, the encapsulation film was re-peeled off and the appearance was observed. It was classified as 0 in the case of being bonded together with no bubbles at all, A when 3 or less bubbles occurred, and X when more than 3 bubbles occurred.

Experimental Example 3-Cutting Property

When the knife press cutting was performed about each of the encapsulation films produced in Examples and Comparative Examples, the shape of the end (edge part) of the film was observed. In the case of the knife press cutting, when the encapsulation film is brittle, the end is often not cut into the desired shape by stress upon cutting. It was classified as X when a part of the encapsulation layer of the end of the encapsulation film fell off to be lost and the shape was not maintained in a rectangular form, A when the shape of the end (edge part, vertex part) was maintained, but a part of the encapsulation layer fell off to be lost, and O when the shape was maintained without loss of the encapsulation layer and the end was cut well.

Experimental Example 4—Moisture Barrier Property

Calcium was deposited in a size of 5 mm×5 mm and a thickness of 100 nm on a glass substrate having a size of 100 mm×100 mm, and the encapsulation films of Examples and Comparative Examples were each attached to cover the entire surface of the calcium. The obtained specimens are observed in a constant temperature and humidity chamber at 85° C. and 85% relative humidity, thereby observing the time when calcium began to become transparent by an oxidation reaction due to moisture permeation. It was represented by ○ when the transparent start time was 700 hours or more, Δ when the transparent start time was less than 700 hours and 500 hours or more, and X when the transparent start time was less than 500 hours.

TABLE 1

|  |  | Coating Appearance | Bonding Property | Cutting Property | Moisture Barrier Property |
|---|---|---|---|---|---|
| Example | 1 | ○ | ○ | ○ | ○ |
|  | 2 | ○ | ○ | ○ | ○ |
|  | 3 | ○ | ○ | ○ | ○ |
|  | 4 | ○ | ○ | ○ | Δ |
|  | 5 | ○ | ○ | Δ | ○ |
|  | 6 | ○ | Δ | ○ | Δ |
| Comparative Example | 1 | X | Δ | ○ | X |
|  | 2 | X | X | ○ | X |

The invention claimed is:

1. An encapsulation composition comprising:
   an encapsulation resin comprising an olefinic resin selected from the group consisting of polyisobutylene and butyl rubber,
   a moisture adsorbent surface-treated with an aliphatic hydrocarbon compound, and a tackifier having a softening point of 102° C. to 120° C.,
   wherein the aliphatic hydrocarbon compound comprises at least one or more polar functional groups,
   wherein the aliphatic hydrocarbon compound has a carbon number in a range of 10 to 40,
   wherein the moisture adsorbent is comprised in a range of 300 to 1000 parts by weight relative to 100 parts by weight of the encapsulation resin,
   wherein the tackifier is comprised in a range of 150 to 400 parts by weight relative to 100 parts by weight of the encapsulation resin, and
   wherein the moisture adsorbent surface-treated with an aliphatic hydrocarbon compound is CaO surface-treated with stearic acid.

2. The encapsulation composition according to claim 1, wherein the moisture adsorbent has a particle diameter of 8 μm or less in a particle size analysis according to D90.

3. The encapsulation composition according to claim 1, wherein the tackifier has a weight average molecular weight in a range of 300 to 5000 g/mol.

4. The encapsulation composition according to claim 1, wherein the tackifier is a polymer polymerized from a monomer having a carbon number in a range of 3 to 15 in the molecular structure.

5. The encapsulation composition according to claim 1, further comprising an active energy ray polymerizable compound.

6. The encapsulation composition according to claim 5, wherein the active energy ray polymerizable compound is included in a range of 2 to 35 parts by weight relative to 100 parts by weight of the encapsulation resin.

7. The encapsulation composition according to claim 1, further comprising a radical initiator.

8. An encapsulation film comprising an encapsulation layer comprising the encapsulation composition of claim 1, wherein the encapsulation layer is a single layer or a multilayer structure of two or more layers.

9. The encapsulation film according to claim 8, wherein the encapsulation layer is said multilayer structure of two or more layers, and said encapsulation layer comprises a first layer including said encapsulation composition, and a second layer including no moisture adsorbent or including a moisture adsorbent in an amount lower than that in said first layer, wherein said moisture adsorbent is CaO surface treated with stearic acid.

10. The encapsulation film according to claim 9, wherein a ratio of the first layer thickness to the second layer thickness is in a range of 1.2 to 8.

11. The encapsulation film according to claim 8, further comprising a metal layer formed on the encapsulation layer.

12. An organic electronic device comprising:
   a substrate;
   an organic electronic element formed on the substrate; and
   the encapsulation film of claim 8 which encapsulates entire surface of the organic electronic element.

13. A method for manufacturing an organic electronic device, comprising:
   a step of applying the encapsulation film of claim 8 to a substrate on which an organic electronic element is formed, so as to cover the organic electronic element.

* * * * *